(12) United States Patent
Tong et al.

(10) Patent No.: US 8,217,962 B2
(45) Date of Patent: Jul. 10, 2012

(54) SINGLE-PASS BOUNDING BOX CALCULATION

(75) Inventors: Xin Tong, Beijing (CN); Chen Li, Redmond, WA (US); Jinyu Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 12/361,676

(22) Filed: Jan. 29, 2009

(65) Prior Publication Data

US 2010/0188404 A1    Jul. 29, 2010

(51) Int. Cl.
G09G 5/00 (2006.01)
G06T 15/00 (2011.01)
G06T 15/40 (2011.01)
(52) U.S. Cl. ......... 345/622; 345/419; 345/421; 345/422
(58) Field of Classification Search .......... 345/419–427, 345/622
See application file for complete search history.

(56) References Cited

U.S. PATENT DOCUMENTS

| | | | |
|---|---|---|---|
| 6,072,505 A | 6/2000 | Piazza et al. | |
| 6,326,964 B1 * | 12/2001 | Snyder et al. | 345/419 |
| 6,747,663 B2 * | 6/2004 | Oberoi et al. | 345/606 |
| 7,218,331 B2 | 5/2007 | Huang et al. | |
| 7,362,325 B2 | 4/2008 | Anderson | |
| 2004/0207622 A1 * | 10/2004 | Deering et al. | 345/426 |
| 2004/0246251 A1 | 12/2004 | Fenney et al. | |
| 2005/0275663 A1 | 12/2005 | Kokojima et al. | |
| 2006/0250410 A1 | 11/2006 | Qi et al. | |
| 2008/0198168 A1 * | 8/2008 | Jiao et al. | 345/506 |
| 2008/0259076 A1 | 10/2008 | Meinds | |
| 2008/0273028 A1 | 11/2008 | Jiao et al. | |

OTHER PUBLICATIONS

PCT Search Report & Written Opinion for PCT Application PCT/US2010/020782, mailed on Aug. 16, 2010, 9 pages.
Antochi, et al., "Efficient Tile-Aware Bounding-Box Overlap Test for Tile-Based Rendering", IEEE 2004, http://ce.et.tudelft.nl/publicationfiles/961_10_cr1019.pdf, 4 pgs.
Fagerjord, et al., "GPGPU: Fast and Easy Distance Field Computation on GPU", Narvik University College, Jul. 2008, http://difi.freya.no/rapport.pdf, 51 pgs.
Georgii, et al., "Interactive GPU-based Collision Detection", IADIS Computer Graphics and Visualization, 2007, http://wwwcg.in.tum.de/Research/data/Publications/cgv07_collision.pdf, 8 pgs.

(Continued)

Primary Examiner — Xiao M. Wu
Assistant Examiner — Andrew Shin
(74) Attorney, Agent, or Firm — Lee & Hayes, PLLC (57) ABSTRACT

Embodiments for single-pass bounding box calculation are disclosed. In accordance with one embodiment, the single-pass bounding box calculation includes rendering a first target to a 2-dimensional screen space, whereby the first target includes at least six pixels. The calculation further includes producing transformed vertices in a set of geometry primitives based on an application-specified transformation. The calculation also includes generating six new points for each transformed vertex in the set of geometry primitives. The calculation additionally includes producing an initial third coordinate value for each pixel by rendering the at least six new points generate for each pixel to each corresponding pixel. The calculation further includes producing a post-rasterization value for each pixel by rasterizing the at least six new points rendered to each pixel with each corresponding pixel. Finally, the calculation includes computing bounding box information for the set of geometry primitives based on the produced third coordinate values.

20 Claims, 4 Drawing Sheets

OTHER PUBLICATIONS

"How to Create the Bounding Box?", retrieved on Dec. 1, 2008 at http://www.opengl.org/discussion_boards/ubbthreads.php?ubb=showflat&Number=232190, OpenGL.org Discussion and Help Forums, 3 pgs.

Rideout, "Computation of Bounding Primitives on the GPU", retrieved on Dec. 2, 2008 at http://www.gamedev.net/reference/programming/features/gpuBoundingSphere/, 5 pgs.

* cited by examiner

SINGLE-PASS BOUNDING BOX CALCULATION

BACKGROUND

In 3-dimensional rendering, geometry primitives (e.g., triangles) that make up polygon models may be projected onto a 2-dimensional surface (e.g., display screen area). The projected geometry primitives may be rasterized and rendered into a finished image. Screen Extension Report (SER) is a graphics functionality that uses the 2-dimensional coordinates of projected triangles to compute 2-dimensional bounding boxes for the rendered regions of these triangles. The computed bounding boxes of the triangles may be further used for triangle collision detection, triangle occlusion detection, and the elimination of redundant triangle rendering. The SER graphics functionality may be implemented by a specialized Graphics Processing Unit (GPU) that includes dedicated SER hardware, such as GPUs included in various gaming systems.

While SER is generally implemented using dedicated SER hardware on a GPU, it is also possible to implement the SER functionality without the dedicated SER hardware by performing multiple processing passes or shifting the computation to the central processing unit (CPU) during graphics rendering.

For example, in some multiple pass tile-based rendering processes, the 2-dimensional rendering target (e.g., display screen area) may be first subdivided into a set of rectangular tiles. In an initial processing pass over the rectangles, the GPU may perform the SER functionality by computing the bounding boxes for the triangles in each rectangular tile. In a second processing pass, the GPU may perform tile-based rendering. Tile-based rendering process may use screen extension information, that is, the bounding boxes computed during the initial processing pass to determine triangles that actually contribute to each rectangular tile (e.g., triangles visible on the surface of each rectangular tile). Accordingly, tile-based rendering may render only the contributing triangles rather than all of the triangles encompassed in each rectangle tile during the process.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Described herein are embodiments for the implementation of a single-pass graphics rendering process that performs 2-dimensional bounding box calculations using a generic graphics processing unit (GPU). As used herein, generic GPU refers to a GPU that does not include dedicated Screen Extension Report (SER) hardware. The 2-dimensional bounding box calculations performed in accordance with the embodiments are equivalent to the calculations performed by the SER functionality executing on a GPU that includes dedicated SER hardware.

The performance of SER-equivalent 2-dimensional bound box calculations as part of a single-pass graphics rendering process, rather than an independent processing pass, may increase processing efficiency by reducing processing overhead. Alternatively, the performance of SER-equivalent 2-dimensional bound box calculations as part of a single-pass graphics rending process may reduce or eliminate the need to burden a central processing unit (CPU) with the SER computations during graphics processing by a generic GPU.

In one embodiment, the single-pass bounding box calculation includes rendering a first target to a 2-dimensional screen space, where the first target includes at least six pixels. The calculation further includes producing transformed vertices in a set of geometry primitives based on an application-specified transformation. The calculation also includes generating six new points for each transformed vertex in the set of geometry primitives. The calculation additionally includes producing an initial third coordinate value for each pixel by rendering the at least six new points generated for each pixel to each corresponding pixel. The calculation further includes producing a post-rasterization value for each pixel by rasterizing the at least six new points rendered to each pixel with each corresponding pixel. Finally, the calculation includes computing bounding box information for the set of geometry primitives based on the produced third coordinate values.

Other embodiments will become more apparent from the following detailed description when taken in conjunction with the accompanying drawings.

BRIEF DESCRIPTION OF THE DRAWINGS

The detailed description is includes references to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to a single-pass graphics rendering implementation that performs Screen Extension Report (SER) equivalent 2-dimensional bound box calculation functionality using a generic graphics processing unit (GPU). Screen Extension Report (SER) is a graphics functionality that uses the 2-dimensional coordinates of projected triangles to compute 2-dimensional bounding boxes of rendered regions of these triangles. The computed bounding boxes of the triangles may be further used for triangle collision detection, triangle occlusion detection, and the elimination of redundant triangle rendering. In some computing systems, the SER functionality may be performed during graphics rendering by a GPU that is equipped with dedicated SER hardware.

In other computing systems where the GPU lacks dedicated SER hardware, the GPU of each computing system may perform the SER functionality via multiple-pass processing (e.g., processing a to-be rendered graphic image for SER information prior to actually rendering the graphics image). In alternative computing systems, the performance of the SER functionality in each computing system may be shifted from the GPU that lacks dedicated SER hardware to a central processing unit (CPU) of the computing system. However, both multiple-pass processing and burden shifting to the CPU to perform SER functionality may result in an additional processing burden and/or processing inefficiency.

Embodiments herein enable the performance of the SER-equivalent 2-dimensional bound box calculation functionality as part of a single-pass graphics rendering process by a generic GPU. As used herein, generic GPU refers to a GPU that does not include dedicated SER hardware. The ability to use a generic GPU to perform the SER functionality in a single pass rendering process may reduce or eliminate the need to burden a central processing unit (CPU) with the SER computations during graphics processing by the generic GPU. Further, the need to perform a dedicated SER processing pass by the generic GPU prior to the actual graphics rendering pass may be eliminated. The elimination of such processing may increase processing efficiency, reduce processing time and/or burden on the respective processors. Various examples of single pass graphics rendering implementations that perform the SER functionality using a generic GPU in accordance with the embodiments are described below with reference to FIGS. 1-4.

Exemplary Scheme

Figure 1:
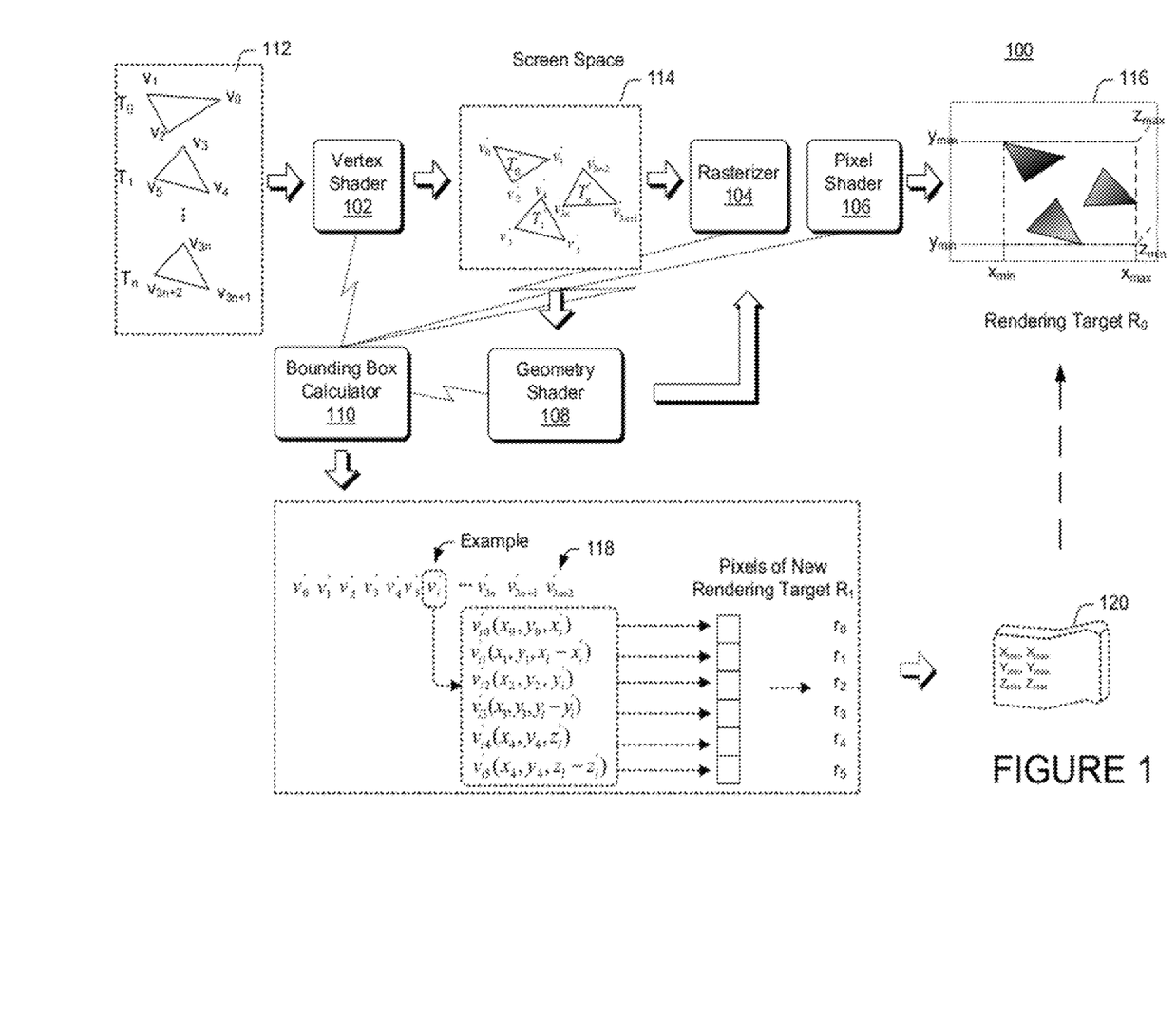
FIG. 1 is a simplified block diagram that illustrates a computing environment for performing a single-pass graphics rendering process that provides Screen Extension Report (SER)-equivalent 2-dimensional bound box calculation functionality using a generic graphics process unit (GPU), in accordance with various embodiments.

FIG. 1 illustrates a computing environment 100 for performing a single-pass graphics rendering process that provides substituted Screen Extension Report (SER) functionality using a generic graphic processing unit (GPU), in accordance with various embodiments. The computing environment 100 may include a plurality of graphics processing components, such as, but not limited to, vertex shader 102, a rasterizer 104, a pixel shader 106, a geometry shader 108, and a bounding box calculator 110. The graphics processing components may, in various combinations, extract SER information from the geometry primitives (e.g., triangles) that make up a polygon model, as well as render the geometry primitives into a finished image for display on a 2-dimensional screen space. As further described with respect to FIG. 2 below, the graphics processing components may be in form of computer-readable instructions, data structures, program modules and/or other data that execute on the generic GPU.

In at least one embodiment, the vertex shader 102 may receive a set of geometry primitives (e.g., triangles 112) from software application. For example, but not as limitations, the software application may be any program, computer readable instructions, or data structures that need to render graphics to a display. The vertex shader 102 may use a GPU to transform the 3-dimensional position for each vertex of each geometry primitive 112 in a 3-dimensional virtual space to 2-dimensional coordinates of screen space, such as screen space 114. Subsequent to processing by the vertex shader 102, the rasterizer 104 may use the GPU to fill the geometry primitives 112 with pixels. Subsequently, the pixel shader 106 may use the GPU to calculate and provide color to the individual pixels that make up the geometry primitives 112 to generate rendered targets, e.g., images 116.

In some embodiments, following processing by the vertex shader 102, the geometry primitives 112 may be further processed by the geometry shader 108 prior to processing by the rasterizer 104. In such embodiments, the geometry shader 108 may add to and remove vertices from the geometry primitives, as well as provide volumetric details to the geometry primitives. As further described, the bounding box calculator 110 may leverage the geometry shader 108 to facilitate the computation of the 2-dimensional bounding boxes of the rendered regions of the geometry primitives 112 during image rendering.

In various embodiment, a set of geometry primitives such as triangles 112, represented by $\{T_0, T_1, \ldots T_n\}$ may include vertices $\{V_0, V_1, V_2, \ldots V_{3n}, V_{3n+1}, V_{3n+2},\}$, by which each V represents a point in a 3-dimensional world space. The vertex shader 102 and the pixel shader 106 may use a GPU to perform application-specified transformations and computations for rendering these triangles 112 into one or more rendering targets, which includes a rendering target $R_0$ (image 116). In various examples, the application specified transformations and computations may be dictated by screen animation requests of a gaming program, graphics editing software, video editing software, and the like. As described below, the screen extension information of the triangles 112 may also be computed in the same rendering pass in various embodiments.

In the same rendering pass, the bounding box calculator 110 may activate the vertex shader 102 and the pixel shader 106 to use the GPU to create a new rendering target $R_1$, where $R_1=\{(x_0,y_0), (x_1,y_1), (x_2, y_2), (x_3, y_3) \ldots (x_5,y_5)\}$. The new rendering target $R_1$ may include six pixels whose screen coordinates, that is, coordinates in a 2-dimensional space, are $(x_0,y_0) \ldots (x_5,y_5)$. The rendering target $R_1$ may be initialized to 0.0. It will be appreciated that in other embodiments, the bounding box calculator 110 may be configured to create a new rendering target $R_1$ that includes more than six pixels. However, as further described below, since the screen extension information include six different bound values, (i.e., $x_{min}, x_{max}, y_{min}, y_{max}, z_{min}, z_{max}$), where each bound value may be computed based on a pixel, the bounding box calculator 110 generally does not use more than six pixels.

Following initialization, the bounding box calculator 110 may load the triangles 112 into the GPU for rendering by the vertex shader 102. In various embodiments, the vertex shader 102 may perform application-specified transformations and computations during the rendering for all vertices of triangles 112 $\{V_0, V_1, V_2, \ldots V_{3n} V_{3n+1} V_{3n+2}\}$. In such embodiments, the application-specified transformations may be the same transformations and computations performed for the rendering target $R_0$. This rendering by the vertex shader 102 may produce transformed vertices 118 $\{V'_0, V'_1, V'_2, \ldots V'_{3n} V'_{3n+1} V'_{3n+2}\}$, for a screen space, such as screen space 114. For example, the screen coordinates of the transformed vertex $V'_i$, may be $(x'_i, y'_i, z'_i)$, whereby $x'_i$ and $y'_i$ may be the screen position of vertex $V'_i$, and $z'_i$ may be the depth value of vertex $V'_i$ within [0.0, 1.0].

To continue the computation of the screen extension of the triangles 112, the bounding box calculator 110 may call the geometry shader 108 to generate six new points from each transformed triangle vertex 118. In at least one embodiment, for each transformed vertex $V'_i(x'_i, y'_i, z'_i)$ in $\{V'_0, V'_1, V'_2, \ldots V'_{3n} V'_{3n+1} V'_{3n+2}\}$, the geometry shader 108 may generate six new points $V'_{i0}(x_0, y_0, x'_i), V'_{i1}(x_1, y_1, x_i\text{-}x'_i), V'_{i2}(x_2, y_2, y'_i), V'_{i3}(x_3, y_3, y_i\text{-}y'_i), V'_{i4}(x_4, y_4, z'_i), V'_{i5}(x_5, y_5, 1.0\text{-}z'_i)$. Subsequently, each of the new points for each transformed triangle vertex 110 may be rendered by the geometry shader 108 to a corresponding pixel (e.g., a pixel of the six previously generated pixels) in the new rendering target $R_1$ in a one-to-one manner. The geometry shader 108 may accomplish this under the direction of the bounding box calculator 110.

As used in the generation of the six new points, $x_l$ and $y_l$, may be large constant values. For example, in at least one embodiment, the width measurement of the rendering target $R_0$ may serve as the value for $x_l$, while the height measurement of the rendering target $R_0$ may serve as the value for $y_l$. The third-coordinate value (i.e., z-value or depth value) of each rendered pixel may be stored in a z-buffer.

Following rendering, each of the new points may be rasterized by the rasterizer 104 to its corresponding pixel in the rendering target $R_1$. Subsequently, the bounding box calculator 110 may compare a current (i.e., post-rasterization) third coordinate value of each pixel with the pixel's previous (i.e., pre-rasterization) third-coordinate value in the rendering target $R_1$. In at least one embodiment, the bounding box calculator 110 may access the previous third-coordinate value of each pixel from the z-buffer.

For each rendered pixel, if the current third-coordinate value of the pixel is larger than the previous third-coordinate value of the pixel, the bounding box calculator 110 may store the current third-coordinate value of the pixel in a corresponding array element of a z-buffer. Otherwise, the bounding box calculator 110 may ignore the current third-coordinate value of the pixel and keep the previous third-coordinate value in the corresponding array element in the z-buffer. In this way, from the final third-coordinate values stored in the array elements of the z-buffer, as represented by $r_0$, $r_1$, $r_2$, $r_3$, $r_4$, $r_5$, the bounding box calculator 110 may compute the screen extension information 120 for the triangles 112 as: $x_{min}=r_0$, $x_{max}=x_l-r_1$, $y_{min}=r_2$, $y_{max}=y_l-r_3$, $z_{min}=r_4$, and $z_{max}=1.0-r_5$. In various embodiments, the screen extension information 120 may be used in a subsequent rendering of the rendering target $R_0$ (image 116), and/or the rendering of the rendering target $R_0$ (image 116) with additional images (e.g., for collision detection, occlusion detection, and the elimination of redundant rendering).

Thus, by performing screen extension calculations during the rendering the geometry primitives 112 (e.g., triangles) into a finished image for display on a 2-dimensional screen space, the screen extension information 120 may be generated with the rendered image (i.e., rendering target $R_0$) in one rendering pass.

Figure 3:
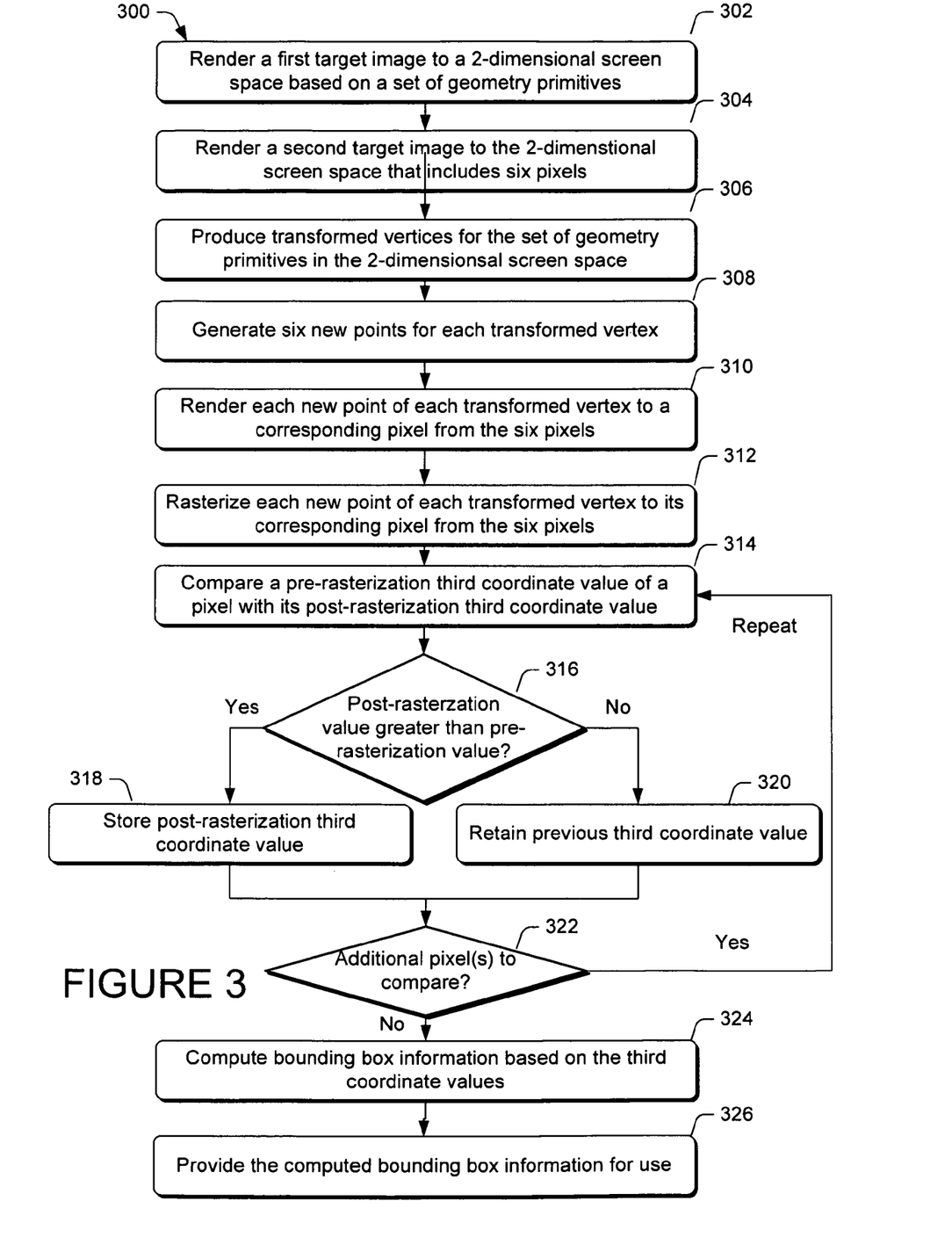
FIG. 3 is a flow diagram illustrating an exemplary process for performing a single-pass graphics rendering process that provides Screen Extension Report (SER)-equivalent 2-dimensional bound box calculation functionality using a generic graphics processing unit (GPU), in accordance with various embodiments.

It will be appreciated the while the performance of a single-pass graphics rendering process that provides substituted Screen Extension Report (SER) functionality is discussed in the context of geometry primitives in the form of triangles, such performance may be further implemented using geometry primitives in the form of other polygons (e.g., rectangles, squares, etc.), as long as such polygons include at least three vertices. Moreover, while the performance of the rendering process is illustrated in FIG. 3 with a set of three geometry primitives (triangles), it will be appreciated that the actual performance of the single-pass graphics rendering process that provide the SER functionality may be implemented in a similar manner on sets that include any number of geometry primitives. Accordingly, the embodiments described herein are not intended to be limitations.

Exemplary Components

Figure 2:
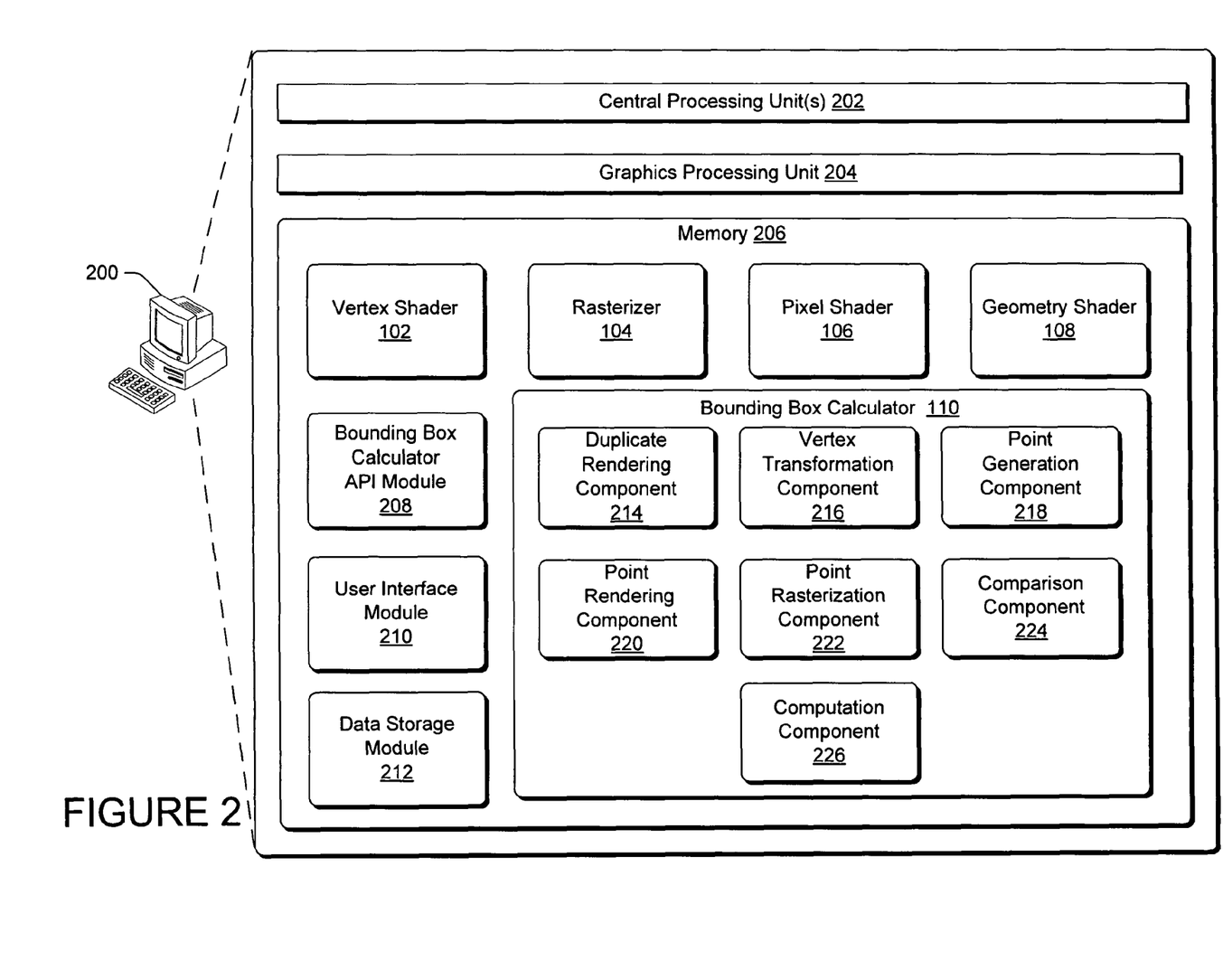
FIG. 2 is a simplified block diagram that illustrates selected components of one exemplary computer device that includes a generic graphics processing unit (GPU) and provides the Screen Extension Report (SER)-equivalent 2-dimensional bound box calculation functionality, in accordance with various embodiments.

FIG. 2 is a block diagram that illustrates selected components of an exemplary computer device 200 that includes a generic graphics processing unit (GPU) 204. The computing environment 100 of FIG. 1 may be implemented on the computing device 200. The exemplary computing device 200 may perform a single-pass graphics rendering process that provides Screen Extension Report (SER)-equivalent bounding box calculation functionality using the generic GPU 204, in accordance with various embodiments. The computing device 200 may include one or more central processor units 202 and memory 206. The memory 206 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system.

The graphics processing unit (GPU) 204 may be a dedicated graphics rendering device for processing 2-dimensional and/or 3-dimensional graphics for display on a display interface (not shown) of the computer device 200. In various embodiments, the GPU 204 may be one of a GPU that includes dedicated hardware for executing the SER functionality, or a generic GPU that does not include the dedicated SER hardware.

The memory 206 may store program instructions. The program instructions, or modules, may include routines, programs, objects, components, and data structures that perform particular tasks or implement particular abstract data types. The selected program instructions may include the vertex shader module 102, the rasterizer 104, the pixel shader 106, the geometry shader module 108, the bounding box calculator 110, a bounding box calculator application program interface (API) module 208, a user interface module 210, and a data storage module 212. In turn, the bounding box calculator 110 may include a duplicate rendering component 214, a vertex transformation component 216, a point generation component 218, a point rendering component 220, a comparison component 222, and a bounding box computation component 224.

The vertex shader 102 may execute on the GPU 204. The vertex shader 102 may transform the 3-dimensional position for each vertex of geometry primitives in a 3-dimensional virtual space to 2-dimensional coordinates of screen space.

The rasterizer 104 may execute on the GPU 204. The rasterizer 104 may fill the geometry primitives (e.g., triangles) with pixels after the geometry primitives have been processed by a vertex shader.

The pixel shader module pixel shader 106 may execute on the GPU 204. The pixel shader may calculate and provide color to the individual pixels that make up the geometry primitives (e.g., triangles) to generate rendered images, such as images 116 (FIG. 1).

The geometry shader 108 may execute on the GPU 204. The geometry shader 108 may add and remove vertices for the geometry primitives, as well as provide volumetric details to the geometry primitives.

The bounding box calculator module 110 may execute on the GPU 204. For example, the duplicate rendering component 214 of the bounding box calculator module 110 may command the vertex shader 102 to render a target, such as target $R_1$, which includes at least six pixels. The vertex transformation component 216 may command the vertex shader 102 to produce transformed vertices, such as transformed vertices 118, for the vertices of geometry primitives. The point generation component 218 may command the geometry shader 108 to generate points for vertices, such as the transformed vertices 118. The point rendering component 220 may command the geometry shader 108 to render the points generated by the point generation component 218 with the pixels generated by the duplicate rendering component 214. The point rendering component 220 may also store the initial (i.e., pre-rasterization) third coordinate value of each pixel in memory 206, such as in a z-buffer. Likewise, the point rasterization component 222 may command the geometry shader 108 to rasterize the points generated by the point generation component 218 with the pixels generated by the duplicate rendering component 214. The point rasterization component 222 may also store the post-rasterization) third coordinate value of each pixel in memory 206, such as in the z-buffer.

The comparison module 224 of the bounding box calculator module 110 may compare the pre-rasterization third coordinate value of each pixel with its post-rasterization third coordinate value to determine the greater of the two values, and retain or store the value in the memory 206, such as in the z-buffer. The computation component 226 may enable the calculation of 2-dimensional bounding box information from the third coordinate values stored in the memory 206.

The bounding box calculator application program interface (API) module 208 may be called by a software application to activate the bounding box calculator 110. In this way, the software application may use the bounding box calculator 110 to implement the SER-equivalent bounding box calculation functionality during the rendering of the geometry primitives into a 2-dimensional screen space. Thus, the calculation of 2-dimensional bounding boxes of the rendered regions of the geometry primitives may be performed in the same pass as the rendering of an image from the geometry primitives.

In various embodiments, the bounding box calculator API module 208 may enable software applications to leverage the bounding box calculator 110 to perform a single-pass image rendering. The single-pass image rendering configured to calculate SER-equivalent bounding box information using a generic GPU 204. Such single pass image rendering and SER information calculation may take place of multiple-pass processes and/or shifting the SER calculations to the CPU 202. In other embodiments where the GPU 204 includes dedicated SER hardware, the bounding box calculator API module 208 may enable a software application to selectively perform at least some SER information calculation without using the dedicated SER hardware, such as in instances of hardware malfunction. The bounding box calculator API module 208 may also serve as an interface to provide software applications with the 2-dimensional bounding box information for a set of geometry primitives.

The user interface module 210 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods.

The user interface module 210 may be configured to enable a user to activate or disable the bounding box calculator 110. For example, the user interface module 212 may enable a user to selectively disable the bounding box calculator 110 so that the SER calculations are performed in multiple passes by the generic GPU 204, or by the CPU 202. Additionally, the user interface module 210 may be further configured to cause the display to output the current status of the bounding box calculator 110, (e.g., active, disabled, error, etc.) to the user.

The data storage module 212 may be configured to store data in a portion of memory 206 (e.g., a database). In various embodiments, the data storage module 212 may be configured to store the SER-equivalent bounding box information produced by the bounding box calculator 110, as well as any intermediary data produced by bounding box calculator 110 during SER-equivalent bounding box calculations. The data storage module 212 may also include a z-buffer. It will be appreciated that the z-buffer is generally configured to store the depth of a generated pixel (third-coordinate value). The z-buffer is usually arranged as a two-dimensional array (e.g., x-y) with one element for each pixel, where each element in the array may be continuously updated with a current third-coordinate value of the pixel.

Exemplary Process

FIG. 3 illustrates an exemplary process 300 for performing a single-pass graphics rendering process that provides Screen Extension Report (SER)-equivalent bounding box calculation functionality using a generic graphics processing unit (GPU), in accordance with various embodiments. The exemplary process 300 in FIG. 3 is illustrated as a collection of blocks in a logical flow diagram, which represents a sequence of operations that can be implemented in hardware, software, and a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the exemplary computing device 200 of FIG. 2, although it may be implemented in other system architectures.

At block 302, the vertex shader 102 and the pixel shader 106 may use a graphics processing unit (GPU) to perform application-specified transformations and computations for rendering geometry primitives (e.g., triangles) into one or more rendering target images in a 2-dimensional screen space, the one or more rendering target images may include a first rendering target $R_0$ (FIG. 1).

At block 304, the bounding box calculator 110 may activate the vertex shader 102 and the pixel shader 106 to use the GPU to create a second rendering target image that includes six pixels. The second rendering target image may be the rendering target $R_1$ (FIG. 1). In various embodiments, the second rendering target image may contain six pixels whose screen coordinates, that is, coordinates in a 2-dimensional space, are $(x_0, y_0) \ldots (x_5, y_5)$. In such embodiments, the second rendering target may be initialized to 0.0.

At block 306, the bounding box calculator 110 may activate the vertex shader 102 to produce transformed vertices for the 2-dimensional screen space based on the geometry primitives. In various embodiments, the vertex shader 102 may produce the transformed vertices by performing the same transformations and computations as is performed at block 302.

At block 308, the bound box calculator 110 may use the geometry shader 108 to generate six new points from each transformed vertex of each geometry primitive (e.g. triangle).

At block 310, the bounding box calculator 110 may use the geometry shader 108 to render each of the new points of each transformed vertex to a corresponding pixel (e.g., a pixel of the six previously generated pixels) in the second rendering target image. In various embodiments, the rendering of each of the new points of each transformed vertex to a corresponding pixel may be done in a one-to-one manner. In other words, as illustrated in FIG. 1, for each transformed vertex, each new point is rendered to one unique pixel from the six previously generated pixels. The third-coordinate value (i.e., z-value or depth value) of each rendered pixel may then be stored in an array element of a z-buffer.

At block 312, the bounding box calculator 110 may activate the rasterizer 104 to rasterize the new points (as from all the transformed vertices) rendered to each pixel with each pixel. It will be appreciated that rasterization may result in a change of the third coordinate value of each pixel.

At block 314, the bounding box calculator 110 may compare the pre-rasterization third coordinate value of a pixel, as from block 310, with the post-rasterization third coordinate value of the pixel, as from the block 312.

At decision block 316, the bound box calculator 110 may determine whether the post-rasterization third coordinate value of the pixel is greater than the pre-rasterization third coordinate value. If the post-rasterization third coordinate value of the pixel is greater than the pre-rasterization coordinate value of the pixel, ("yes" at decision block 316), the process 300 may proceed to block 318.

At block 318, the bounding box calculator 110 may store the post-rasterization third coordinate value into the array element in the z-buffer that stored the pre-rasterization third coordinate value for the pixel. In other words, the pre-rasterization third-coordinate value of the pixel in the z-buffer is replaced by the post-rasterization value of the pixel.

Returning to block 316, if the bounding box calculator 110 determines that the post-rasterization third coordinate value of the pixel is not greater than the pre-rasterization coordinate value of the pixel, ("no" at decision block 316), the process 300 may proceed to block 320.

At block 320, the bounding box calculator 110 may ignore the post-rasterization third coordinate value of the pixel and retain the pre-rasterization third coordinate value in the z-buffer array element for the pixel.

At decision block 322, the bounding box calculator 110 may determine whether the pre-rasterization vs. post-rasterization third coordinate value comparison is to be performed for one or more additional pixels. In other words, the bounding box calculator 110 may determine whether the comparison has been implemented for all of the at least six pixels. If the bounding box calculator 110 determines that the comparison may be performed for additional pixels, ("yes" at decision block 322), the process 300 may loop back to block 314. The loop may be repeated until the pre-rasterization vs. post-rasterization third coordinate value comparison has been implemented for all of the at least pixels.

However, if the bounding box calculator 110 determines that the pre-rasterization vs. post-rasterization third coordinate value comparisons have been performed for all of the at least six pixels ("no" at decision block 322), the process 300 may proceed to block 324.

At block 324, the bounding box calculator 110 may compute the bound box information based on the third coordinate values of the pixels stored in the z-buffer. As described above, in embodiments where the third coordinate values may be represented by $r_0, r_1, r_2, r_3, r_4, r_5$, the bounding box calculator 110 may compute the 2-dimensional bounding box information for the geometry primitives as: $x_{min}=r_0$, $x_{max}=x_l-r_1$, $y_{min}=r_2$, $y_{max}=y_l-r_3$, $z_{min}=r_4$, and $z_{max}=1.0-r_5$.

At block 326, the computed bounding box information may be provided for use (e.g., for collision detection, occlusion detection, and the elimination of redundant rendering).

In various embodiments, the computed bounding box information may be at least one of displayed, provide to an application, saved in a data storage, or inputted back into the vertex shader 102, rasterizer 104, and/or the pixel shader 106 for rendering additional images.

It will be appreciated that blocks 304 through 324 may be implemented in the same processing pass as block 302. Thus, processing overhead may be reduced and processing efficiency increased.

Exemplary Computing Environment

Figure 4:
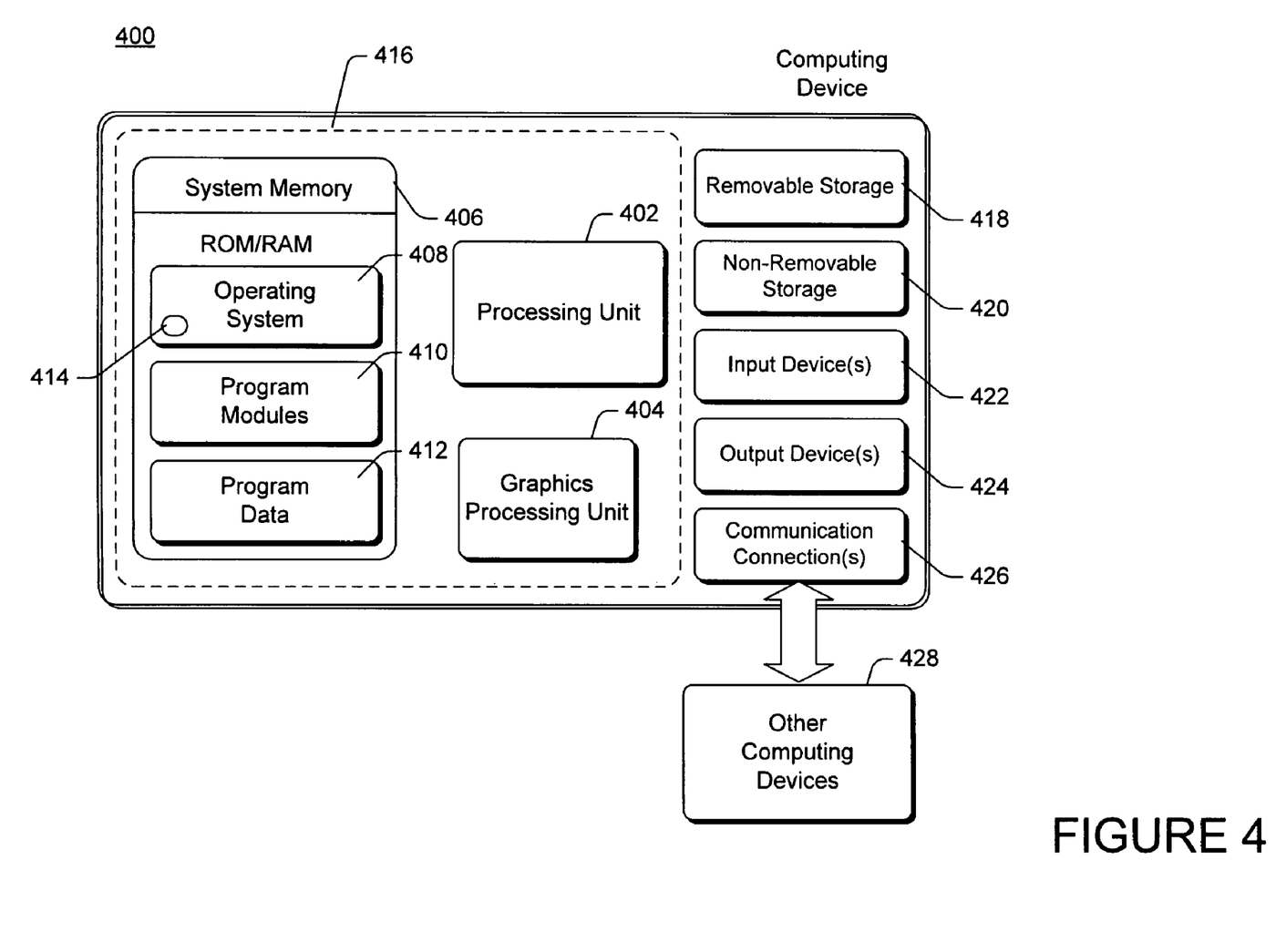
FIG. 4 illustrates a representative computing system that is used to implement techniques and mechanisms for performing a single-pass graphics rendering process that provides Screen Extension Report (SER)-equivalent 2-dimensional bound box calculation functionality using a generic graphics process unit (GPU), in accordance with various embodiments.

FIG. 4 illustrates a representative computing system 400 that is used to implement techniques and mechanisms for performing a single-pass graphics rendering process that provides Screen Extension Report (SER)-equivalent bounding box calculation functionality using a generic graphics processing unit (GPU). The exemplary computing device 200, as described in FIG. 2, may include one or more components of the computing system 400. However, it will be readily appreciated that the techniques and mechanisms may be implemented in other computing devices, systems, and environments. The computing system 400 shown in FIG. 4 is only one example of a computing device and is not intended to suggest any limitation as to the scope of use or functionality of the computer and network architectures. Neither should the computing system 400 be interpreted as having any dependency or requirement relating to any one or combination of components illustrated in the example computing device.

In a very basic configuration, computing system 400 typically includes at least one processing unit 402, a graphics process unit (GPU) 404, and system memory 406. Depending on the exact configuration and type of computing device, system memory 406 may be volatile (such as RAM), non-volatile (such as ROM, flash memory, etc.) or some combination of the two. System memory 406 typically includes an operating system 408, one or more program modules 410, and may include program data 412. The operating system 408 includes a component-based framework 414 that supports components (including properties and events), objects, inheritance, polymorphism, reflection, and provides an object-oriented component-based application programming interface (API), such as, but by no means limited to, that of the .NET™ Framework manufactured by the Microsoft Corporation, Redmond, Wash. The device 400 is of a very basic configuration demarcated by a dashed line 416. Again, a terminal may have fewer components but will interact with a computing device that may have such a basic configuration.

Computing system 400 may have additional features or functionality. For example, computing system 400 may also include additional data storage devices (removable and/or non-removable) such as, for example, magnetic disks, optical disks, or tape. Such additional storage is illustrated in FIG. 4 by removable storage 418 and non-removable storage 420. Computer storage media may include volatile and nonvolatile, removable and non-removable media implemented in any method or technology for storage of information, such as computer readable instructions, data structures, program modules, or other data. System memory 406, removable storage 418 and non-removable storage 420 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing system 400. Any such computer storage media may be part of device 400. Computing system 400 may also have input device(s)

422 such as keyboard, mouse, pen, voice input device, touch input device, etc. Output device(s) 424 such as a display, speakers, printer, etc. may also be included. These devices are well known in the art and are not discussed at length here.

Computing system 400 may also contain communication connections 426 that allow the device to communicate with other computing devices 428, such as over a network. These networks may include wired networks as well as wireless networks. Communication connections 426 are some examples of communication media. Communication media may typically be embodied by computer readable instructions, data structures, program modules, etc.

It is appreciated that the illustrated computing system 400 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The performance of the SER-equivalent bounding box calculations as part of a single-pass graphics rendering process on a generic GPU, rather than an independent processing pass, may increase processing efficiency by reducing processing overhead. Alternatively, the performance of the SER-equivalent bounding box calculations as part of a single-pass graphics rending process may reduce or eliminate the need to burden a central processing unit (CPU) with the SER computations during graphics processing by a generic GPU. Thus, embodiments in accordance with this disclosure may improve the efficiency of image processing and rendering on the generic GPU.

Conclusion

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A system, comprising:
a plurality of rendering components to render one or more target images to a 2-dimensional screen space based on a set of geometry primitives, the plurality of rendering components including a vertex shader, a rasterizer, a geometry shader, and a pixel shader, the one or more target images including a first target image;
a duplicate rendering component to command the vertex shader render a second target image to the 2-dimensional screen space, the second target image including at least six pixels;
a vertex transformation component to command the vertex shader to produce transformed vertices for the set of geometry primitives of a polygon model to be projected onto the 2-dimensional screen space;
a point generation component to command the geometry shader to generate at least six new points for each of the transformed vertices of the set of geometry primitives;
a point rendering component to command the geometry shader to render the at least six new points generated for each of the transformed vertices to a corresponding pixel from the at least six pixels of the second target image, each rendering to a corresponding pixel producing an initial third coordinate value for the corresponding pixel;
a point rasterization component to command the rasterizer to rasterize the at least six new points rendered to each corresponding pixel for each corresponding pixel, each rasterization to a corresponding producing a post-rasterization third-coordinate value for the corresponding pixel;
a comparison component to store a greater value of the initial third coordinate value and the post-rasterization third coordinate value for each pixel; and
a computation component to compute the bound box information for the set of geometry primitives based on the stored greater values for the at least six pixels.

2. The system of claim 1, further comprising an interface component to provide the computed bounding box information to an application.

3. The system of claim 1, further comprising an interface component to provide the computed bounding box information to an application for at least one of geometry primitive collision detection, geometry primitive occlusion detection, or elimination of redundant rendering.

4. The system of claim 1, wherein the comparison component is to store the greater value in a z-buffer.

5. The system of claim 1, wherein the bounding box computation module is to compute the bounding box information for the set of geometry primitives by representing the greater values as r0, r1, r2, r3, r4, r5, respectively, and calculating the bounding box information as:

$$x_{min}=r_0, x_{max}=x_l-r_1, y_{min}=r_2, y_{max}=y_l-r_3, z_{min}=r_4, \text{ and}$$
$$z_{max}=1.0-r_5$$

where $x_l$ and $y_l$ are constant values.

6. The system of claim 5, wherein $x_l$ is a width measurement of the first target image and $y_l$ is a length measurement of the first target image, respectively.

7. The system of claim 1, further comprising an application programming interface (API) to enable one of activate or disable components in a bounding box calculator, the bounding box calculator including the duplicate rendering component, the vertex transformation component, the point rendering component, the point rasterization component, the comparison component, and the bounding box computation components.

8. The system of claim 5, wherein the set of geometry primitives include polygons.

9. A method, comprising:
rendering a target image to a 2-dimensional screen space, the first target image including at least six pixels;
producing transformed vertices in a set of geometry primitives based on an application-specified transformation;
generating at least six new points for each of the transformed vertices in the set of geometry primitives;
producing an initial third coordinate value for each pixel by rendering the at least six new points generate for each pixel to each corresponding pixel of the at least six pixels of the target image;
producing a post-rasterization value for each pixel by rasterizing the at least six new points rendered to each pixel with each corresponding pixel;
storing a greater value of the initial third coordinate value and the post-rasterization third coordinate value for each pixel; and
computing bounding box information for the set of geometry primitives based on the stored greater values for the at least six pixels.

10. The method of claim 9, further comprising providing the computed bounding box information to an application.

11. The method of claim 9, further comprising rendering one or more other target images to the 2-dimensional screen space based on the set of geometry primitives and the application-specified transformations prior to the rendering of the target image, wherein the rendering of the one or more other target images occurs in a same processing pass as the computing bounding box information.

12. The method of claim 9, wherein the storing includes storing the greater value in a z-buffer.

13. The method of claim 11, wherein the computing of the bounding box information for the set of geometry primitives includes representing the greater values as r0, r1, r2, r3, r4, r5, respectively, and calculating the bounding box information as:

$$x_{min}=r_0, x_{max}=x_l-r_1, y_{min}=r_2, y_{max}=y_l-r_3, z_{min}=r_4, \text{ and } z_{max}=1.0-r_5$$

where $x_l$ and $y_l$ are constant values.

14. The method of claim 13, wherein $x_l$ is a width measurement of an additional target image of the one or more images and $y_l$ is a length measurement of the additional target image, respectively.

15. The method of claim 9, wherein the set of geometry primitives include polygons.

16. A computer readable memory storing computer-executable instructions that, when executed, cause one or more processors to perform acts comprising:
rendering a target image to a 2-dimensional screen space, the first target image including at least six pixels;
producing transformed vertices in a set of geometry primitives based on an application-specified transformation;
generating at least six new points for each transformed vertex in the set of geometry primitives;
producing an initial third coordinate value for each pixel by rendering the at least six new points generate for each pixel to each corresponding pixel of the at least six pixels of the target image;
storing the initial third coordinate value for each pixel in a buffer;
producing a post-rasterization value for each pixel by rasterizing the at least six new points rendered to each pixel with each corresponding pixel;
replacing the initial third coordinate value of one or more pixels stored in the buffer if the post-rasterization third coordinate value of each of the one or more pixels is greater than its corresponding initial third coordinate value; and
computing bounding box information for the set of geometry primitives based on the third coordinate values stored in the buffer for the at least six pixels.

17. The computer readable memory of claim 16, the computer-executable instructions, when executed, further cause the one or more processors to perform acts comprising providing the computed bounding box information to an application.

18. The computer readable memory of claim 16, the computer-executable instructions, when executed, further cause the one or more processors to perform acts comprising rendering an additional target image to the 2-dimensional screen space based on the set of geometry primitives and the application-specified transformations, wherein the rendering of the additional target image occurs in a same processing pass as the computing bounding box information.

19. The computer readable memory medium of claim 18, wherein the computing of the bounding box information for the set of geometry primitives includes representing the greater values as r0, r1, r2, r3, r4, r5, respectively, and calculating the bounding box information as:

$$x_{min}=r_0, x_{max}=x_l-r_1, y_{min}=r_2, y_{max}=y_l-r_3, z_{min}=r_4, \text{ and } z_{max}=1.0-r_5$$

where $x_l$ and $y_l$ are constant values.

20. The computer readable memory of claim 19, wherein $x_l$ is a width measurement of the additional target image and $y_l$ is a length measurement of the additional target image, respectively.

* * * * *